UNITED STATES PATENT OFFICE.

ALEXANDER EIBNER, OF MUNICH, GERMANY.

MANUFACTURE OF CINNABAR.

1,137,467.

Specification of Letters Patent. Patented Apr. 27, 1915.

No Drawing. Application filed September 4, 1914. Serial No. 860,149.

*To all whom it may concern:*

Be it known that I, ALEXANDER EIBNER, citizen of Germany, residing at Munich, Bavaria, Germany, have invented certain new and useful Improvements in the Manufacture of Cinnabar, of which the following is a specification.

According to German Patent No. 263472 cinnabar insensible to light is obtained by the wet process from the elements mercury and sulfur, from mineral æthiops, white precipitate, black precipitate, protochlorid of mercury, simple soluble mercuric salts, and the black, water insoluble mercury-potassium-sulfid double salts of Ch. Ditte.

The theoretical bases of the invention above defined are found—

1. In the substantial difference of the specific volumes of black and red mercuric sulfid (W. Spring—*Zeitschrift Inorganic Chemistry*, 7, 371 of 1894. At 23.5° precipitated black mercuric sulfid has a specific volume of 131.496 and red mercuric sulfid has a specific volume of 123.082). In the production of cinnabar by the wet process, the object of the method of procedure is to reduce as much as possible the specific volume of the resulting cinnabar.

2. In the presence of several physically different varieties of the black mercuric sulfid, which are distinguished from each other by different specific volumes. Of these, the ones having the least specific volume must yield the most permanent cinnabars, *i. e.* in which the tendency to conversion into the electrical conducting variety is the least.

From the foregoing it was to be assumed that cinnabars produced from different materials would show differences in the degrees of their insensibility to light; and this assumption was substantiated by experiments, extending over years, by which the cinnabars were exposed to light. It was found that cinnabars produced from the Brunner-Ditte white double salt $HgS.K_2S5H_2O$ (J. Brunner: *Pogg. Ann.* 15, 593 (1829); Ch. Ditte: *Ann. de Chim. et Phys.* (8): 12, 229 (1907)) are less sensible to light than the least light sensible cinnabars produced according to the process of German Patent 263472. The explanation for this fact is found in the assumption that the mercuric sulfid resulting from the treatment of the white double salt to produce cinnabars has the least specific volume of all the modifications of this combination.

It was further found that—1. Not only the precipitated black mercuric sulfid (Brunner, *supra*) but also the red mercuric sulfid is sufficiently soluble in simple sulfid potassium solution, forming the above mentioned white double salt. 2. That the solubility of the natural cinnabar ores in this medium is such that a process for the technical production of cinnabar may be based thereon. 3. That from the solution of the double salt so obtained, the cinnabar may be more quickly and simply produced than from the materials referred to in German Patent No. 263472; and, 4. That according to this new process all colors of commercial cinnabar, from the lightest to the darkest, can be produced. These factors enable me to provide a new method or process of producing cinnabar, insensible to light in a degree hitherto unattainable, directly from ores by the wet process, which process by reason of the absence of the necessity of segregating the mercury or the mercury combinations, as well as of the simplicity of the operations, is far superior to all former commercial practices of producing cinnabar by the wet process.

In practising the process I proceed as follows:—The preferably finely powdered ore (granular of about 0.5 mm.) as for example cinnabar ore, steel ore of Idria, hepatic mercuric ore, inflammable mercurial ore, quartzite ores poor in cinnabar, or gray mercurial ore is extracted at water bath temperature by means of a solution (preferably 1:1) containing as much simple potassium sulfid as the ores contain mercuric sulfid, the mass being frequently agitated by suitable means. It is advisable not to heat over an open fire because formation of the insoluble black Ditte double salt might take place. The solution is drawn off, when cold, and is placed portion after portion into a cold solution (preferably 1:1) of fresh commercial pentavalent sulfid of potassium, the mass being subjected to agitation. The solution last mentioned is preferably one which had been used for increasing the quantity of flower of sulfur previously employed to convert the simple sulfid of potassium into pentasulfid. If very rich ores are used (steel ores, etc.,) use one half the weight in sulfur of the simple sulfid of potassium. Steel ore is bituminous marl impregnated with cinnabar. Upon coming into contact with this mixture, the double salt decomposes and forms black mercuric sulfid and complex sulfid of potassium $$(HgS.K_2S.5H_2O+S_4=HgS+K_2S_5+5H_2O).$$

The whole is then heated in a water bath. The conversion into cinnabar in all cases takes place in from one-half to one hour. To obtain the greatest degree of insensibility to light and variations of tint heating in the steam bath is continued from 12 to 24 hours.

The further treatment consists in draining off, washing with a fresh solution of pentasulfid of potassium, exhausting with hot water, and drying at approximately 100°. Cinnabar produced according to the quantity of sulfur above mentioned is entirely or practically free from free sulfur. Should desulfurization be necessary it may be effected by extraction with fresh liver of sulfur solution (preferably 1:1) at water bath temperature or by means of sulfuret of carbon.

It is obvious that in this process, the sulfur is not used for the formation of mercuric sulfid, but is used for the quantitative separation of the existing mercuric sulfid out of the solution of the double salt by the production of pentavalent sulfid of potassium.

The cinnabars produced according to this process vary from light to medium tints (tints Siegle No. 00 to 3). They are either chemically or technically pure, because by the simple sulfid of potassium none of the usual constituents of the ore other than mercuric sulfid are extracted in any substantial quantities, and in the further process of manufacture none thereof or but infinitesimal quantities will pass over into the product. According to the kind of ore employed, these cinnabars may contain traces of ferro-sulfuret present in all technical cinnabars, also small quantities of argillaceous earth of silicic acid hydrate. The former may be extracted by means of dilute muriatic acid.

If a cinnabar contains free mercury as a constituent, it remains in the gangue after the macerating process and after conversion into mercuric sulfid may be obtained as cinnabar by application of the above described process. Cinnabar in tint like Siegle No. 4 to 6 or Idria V 00 are obtained if the solution of the white double salt is introduced in the liver of sulfur solution and the flower of sulfur is then added, or if the latter solution is placed in the former, or if the former is mixed hot with the latter.

*Examples.*

1. 65 g. pulverized steel ore of Idria are extracted in the manner described by means of a solution (1:1) of 60 g. simple sulfid of potassium. The subsequent washing for exhaustion of the residue is effected with water to which a quantity of $K_2S$ is added, as pure water decomposes the double salt and separates out HgS. The liquor when cool is introduced, as indicated, into a solution consisting of an intimate admixture of sulfur saturated hepatic sulfur solution (1:1) and 35 g. flower of sulfur and then heated in a water bath. Cinnabar formation in ¼ hour. Further heated 24 hours in the steam bath and desulfurized. Yield:— 57 g.; tint:—Siegle No. 3.

2. 65 g. hepatic mercurial ore of Idria treated with the like quantities as indicated above, yielded 58 g. sulfur free cinnabar; tint Siegle No. 0.

3. 60 g. steel ore of Idria; yield 50 g. cinnabar free of sulfur; tint; Siegle No. 00.

4. 54 g. inflammable mercurial ore of Idria; yield 50 g. cinnabar free of sulfur; tint Siegle No. 2.

5. 135 g. quartz ore of Idria poor in cinnabar; 45 g. simple sulfid of potassium; 25 g. flower of sulfur; heated 20 hours; yield 24 g. cinnabar free of sulfur; tint Siegle No. 2.

6. 50 g. hepatic cinnabar ore of Idria; quantities of reagents as in example No. 1; yield 45 g. cinnabar free of sulfur; tint Siegle No. 6.

7. 58 g. cinnabar ore from Sierra Madre; yield 53 g. cinnabar; tint Seigle No. 5.

8. 55 g. steel ore of Idria; yield 50 g. cinnabar free of sulfur; tint Arzberger No. 6.

What I claim is:—

The herein described method of producing light insensible cinnabar of varying tints from cinnabar ores and minerals containing mercuric sulfid, which process consists in treating said ores with a solution of simple sulfid of potassium thus forming a double salt solution, $$(HgS.K_2S+5H_2O),$$

permitting said last named solution to cool and introducing the same into a cold sulfur saturated solution of liver of sulfur and flower of sulfur whereby said double salt is decomposed into black mercuric sulfid and complex sulfid of potassium, and thereafter heating the entire mass for a predetermined period to produce cinnabar of a desired tint.

In testimony whereof I affix my signature in presence of two witnesses.

ALEXANDER EIBNER.

Witnesses:
 A. V. W. COTTER,
 W. ROEDER.